United States Patent
Fassnacht et al.

(10) Patent No.: US 9,190,869 B2
(45) Date of Patent: Nov. 17, 2015

(54) CIRCUIT FOR OPERATING AN AUXILIARY UNIT FOR STARTING INTERNAL COMBUSTION ENGINES

(75) Inventors: Jochen Fassnacht, Calw (DE); Torsten Heidrich, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 675 days.

(21) Appl. No.: 13/390,659

(22) PCT Filed: Jul. 5, 2010

(86) PCT No.: PCT/EP2010/059532
§ 371 (c)(1),
(2), (4) Date: May 1, 2012

(87) PCT Pub. No.: WO2011/023438
PCT Pub. Date: Mar. 3, 2011

(65) Prior Publication Data
US 2012/0206109 A1 Aug. 16, 2012

(30) Foreign Application Priority Data
Aug. 28, 2009 (DE) .......................... 10 2009 028 965

(51) Int. Cl.
*H02J 7/00* (2006.01)
*H02J 7/14* (2006.01)

(52) U.S. Cl.
CPC .................................. *H02J 7/1423* (2013.01)

(58) Field of Classification Search
CPC ................... F02N 2200/061; F02N 2200/063; F02N 11/0855; F02N 2200/062; F02N 2300/2006; F02N 2300/2008; F02N 11/0818; F02N 11/108; F02N 2200/042; F02N 11/08; F02N 11/14; H02J 7/1423
See application file for complete search history.

(56) References Cited

U.S. PATENT DOCUMENTS

| | | | |
|---|---|---|---|
| 6,522,960 B2 | 2/2003 | Nada | |
| 2001/0041952 A1 * | 11/2001 | Nada | ............................... 701/22 |
| 2004/0084232 A1 | 5/2004 | Obayashi | |
| 2004/0201362 A1 | 10/2004 | Borrego Bel et al. | |
| 2004/0212351 A1 * | 10/2004 | Kneifel et al. | ................ 320/149 |
| 2005/0088144 A1 * | 4/2005 | Pacholok et al. | ............. 320/131 |
| 2006/0097577 A1 * | 5/2006 | Kato et al. | ................... 307/10.1 |

FOREIGN PATENT DOCUMENTS

| | | |
|---|---|---|
| CN | 1441527 | 9/2003 |
| CN | 1967967 | 5/2007 |
| EP | 115 18 92 | 11/2001 |

(Continued)

*Primary Examiner* — Nha Nguyen
(74) *Attorney, Agent, or Firm* — Kenyon & Kenyon LLP

(57) ABSTRACT

A circuit is described for operating an auxiliary unit for starting internal combustion engines via a starter battery. The circuit is configured to receive a state-of-function signal, a state-of-charge signal and/or a state-of-health signal from a battery-management system. The respective signals indicate whether the starter battery is capable of operating the auxiliary unit, what state of charge the starter battery has and whether the starter battery is damaged. The circuit is configured to draw electrical energy from a high-voltage battery, connected to the circuit, when the state-of-function signal indicates that operation of the auxiliary unit by the starter battery is not possible, when the state-of-charge signal indicates that the state of charge of the starter battery is too low to operate the auxiliary unit and/or when the state-of-health signal indicates that the starter battery is damaged.

18 Claims, 1 Drawing Sheet

(56) References Cited

FOREIGN PATENT DOCUMENTS

| EP | 1 469 575 | 10/2004 |
|----|-----------|---------|
| JP | 2001/320807 | 11/2001 |
| JP | 2004-532768 | 10/2004 |
| JP | 2004-306844 | 11/2004 |
| JP | 2008-180207 | 8/2008 |
| WO | 03/004315 | 1/2003 |
| WO | 2006/112510 | 10/2006 |

* cited by examiner

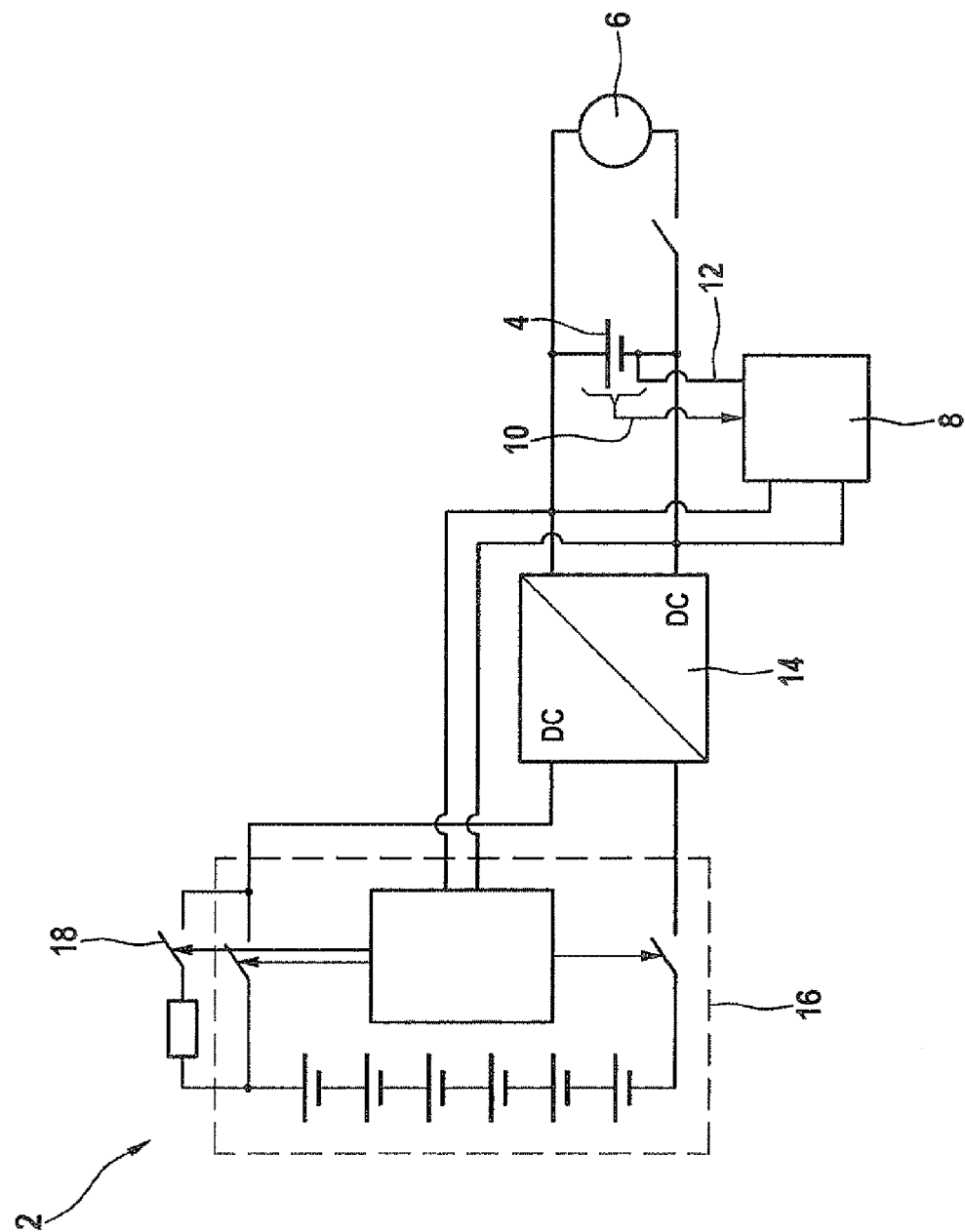

CIRCUIT FOR OPERATING AN AUXILIARY UNIT FOR STARTING INTERNAL COMBUSTION ENGINES

FIELD OF THE INVENTION

The present invention relates to a circuit for operating an auxiliary unit for starting internal combustion engines via a starter battery, the circuit being intended to receive a state-of-function signal, a state-of-charge signal and/or a state-of-health signal from a battery-management system, the respective signals indicating whether the starter battery is capable of operating the auxiliary unit, what state of charge the starter battery has and whether the starter battery is damaged; and a method for receiving an electrical energy which is suitable to operate an auxiliary unit for starting internal combustion engines via a starter battery.

BACKGROUND INFORMATION

It is understood that many or certain internal combustion engines for vehicles are unable to generate any torque during standstill, so that the engine is also unable to start up by itself. Therefore, generally an induction cycle and a compression cycle must be triggered to start the internal combustion engine. An auxiliary unit, colloquially called a starter or starter motor, usually fulfills this function. It is an electric motor operated by a 12V battery in the vehicle.

Printed patent publication EP 115 18 92 A2 refers to recharging the 12V battery from a high-voltage battery prior to starting the internal combustion engine, if the output voltage of the 12V battery is too low. Printed patent publication U.S. Published Patent Application No. 2001 041 952 discusses adjusting the power drawn from the high-voltage battery based on a comparison of the output voltage of the 12V battery to various reference voltages. Printed publications JP 2001 320 807 A, U.S. Pat. No. 6,522,960 B2 and JP 33 81708 B2, refer to charging the 12V battery upon recognition its output voltage is too low, and at the same time, to check whether the instantaneous output voltage of the 12V battery is sufficient to immediately start the internal combustion engine.

This procedure is very proficient for the operation of an axle split hybrid or other hybrid vehicle in which the auxiliary unit for starting the internal combustion engine is operated from a 12V battery. For example, if the steady-state voltage of the 12V battery is too low because of too long a time parked, or because of a high no-load current, and therefore too great a discharge, then the battery is first recharged before starting an internal combustion engine. A presumably failing attempt to start the internal combustion engine is thereby avoided, since it would probably only lead to an even greater rundown of the battery.

However, it often turns out that attempts to start the internal combustion engine nevertheless prove unsuccessful, even though the system described above detects a sufficiently high output voltage of the 12V battery for the operation of the auxiliary unit to start the internal combustion engine.

SUMMARY OF THE INVENTION

An object of the exemplary embodiments and/or exemplary methods of the present invention is thus to indicate a circuit for operating an auxiliary unit for starting internal combustion engines via a starter battery, by which failing attempts to start the internal combustion engine may be avoided in a more reliable manner.

Therefore, the exemplary embodiments and/or exemplary methods of the present invention provide a circuit for operating an auxiliary unit for starting internal combustion engines via a starter battery. The circuit is conceived to receive a state-of-function signal, a state-of-charge signal and/or a state-of-health signal from a battery-management system. Accordingly, the individual signals indicate whether the starter battery is capable of operating the auxiliary unit, what state of charge the starter battery has and whether the starter battery is damaged. According to the exemplary embodiments and/or exemplary methods of the present invention, the circuit is intended to absorb electrical energy from a high-voltage battery, connected to the circuit, when the state-of-function signal indicates that operation of the auxiliary unit by the starter battery is not possible, when the state-of-charge signal indicates that the state of charge of the starter battery is too low to operate the auxiliary unit and/or when the state-of-health signal indicates that the battery is damaged.

It has turned out that when using the steady-state voltage, i.e., the battery voltage as indication for the capability of a starter battery to successfully start an internal combustion engine, the charge can only be inferred very roughly, and the performance capability of the battery cannot be inferred at all. However, these properties of the starter battery are more important for a successful engine start than the battery voltage. Since according to the exemplary embodiments and/or exemplary methods of the present invention, the performance capability of the starter battery is assessed based on at least one of these properties, failed attempts to start the internal combustion engine are avoided more successfully, which in turn prevents too great a discharge of the starter battery and increases its service life perceptibly.

An aspect of the exemplary embodiments and/or exemplary methods of the present invention is therefore to assess the anticipated success of an attempt to start the internal combustion engine with a starter battery, not on the basis of its voltage, but rather on the basis of the values, made available by the battery-management system, concerning the state of charge of the starter battery, the ability to perform a specific function and/or the state of aging of the battery. The great advantage of the exemplary embodiments and/or exemplary methods of the present invention is now that these values are considerably more meaningful than the battery voltage for assessing the probable success of the attempt to start the internal combustion engine with the starter battery. Ideally, to that end, first of all the state-of-function value may be utilized, which indicates whether the starter battery is capable at all of starting an internal combustion engine.

The further descriptions herein disclose further exemplary embodiments or aspects of the present invention.

In one special embodiment of the present invention, the circuit is intended to charge the starter battery with the absorbed electrical energy when the state-of-charge signal from the battery-management system indicates the state of charge of the starter battery is too low to operate the auxiliary unit. That is, the starter battery is now recharged based at least on the ability to attempt to start the internal combustion engine, and based on its state of charge, which brings with it the great advantage that these values are considerably more meaningful for ascertaining the need to recharge the starter battery in terms of the capability to start the internal combustion engine, than the battery voltage conventionally used.

A display may be provided in the circuit to indicate the charging time remaining until the starter battery is charged sufficiently to operate the auxiliary unit. For example, this indicator may be used as orientation for a driver.

Alternatively or additionally, the circuit may be provided to charge the starter battery with the absorbed electrical energy when the state-of-health signal from the battery-management system indicates a sufficiently intact state of function of the starter battery, in which the starter battery is capable of taking up adequate electrical energy to operate the auxiliary unit. In this manner, it may be decided whether, in spite of damage to the starter battery, it is worthwhile to recharge it, since the internal combustion engine may still be started by it, or whether this is not possible, and no recharge then needs to take place, either.

In another or additional refinement, the circuit may be provided for the direct operation of the auxiliary unit using the absorbed energy. Thus, together with the starter battery, attempt may be made to start the internal combustion engine using the combined power.

In addition, an energy converter may be provided to convert the electrical energy, absorbed from the high-voltage battery, to an electrical energy suitable for operating the auxiliary unit.

In this context, the energy converter may be designed to limit the electrical energy output to the auxiliary unit. In this manner, the load dump upon shedding of the auxiliary unit after the start of the internal combustion engine is taken into account, thus avoiding an all too sharp increase of the low voltage in the circuit.

In one special embodiment, the energy drawn from the high-voltage battery may be limited based on the energy output to the auxiliary unit, so that the low-voltage rise in the case of the load dump may be corrected.

In a further or alternative special development, a precontrol unit may be provided to adjust the energy supplied to the at least one energy converter based on a predetermined power requirement for starting the engine, which likewise leads to a sufficiently rapid limitation of the low-voltage rise in the case of the load dump.

The exemplary embodiments and/or exemplary methods of the present invention also provides a method for receiving an electrical energy, the energy being suitable for operating an auxiliary unit for starting internal combustion engines via a starter battery. The method includes the step of receiving a state-of-function signal, a state-of-charge signal and/or a state-of-health signal from a battery-management system which indicate, respectively, whether the starter battery is capable of operating the auxiliary unit, what state of charge the starter battery has and whether the starter battery is damaged, and the step of receiving the electrical energy from a high-voltage battery when the state-of-function signal indicates that operation of the auxiliary unit by the starter battery is not possible, when the state-of-charge signal indicates that the state of charge of the starter battery is too low to operate the auxiliary unit and/or when the state-of-health signal indicates that the starter battery is damaged.

The features according to the further refinements of the circuit according to the present invention may be realized correspondingly in the method of the present invention.

In the following, a non-limiting exemplary embodiment of the present invention is described in detail with reference to the accompanying drawing.

BRIEF DESCRIPTION OF THE DRAWING

FIG. 1 shows a circuit diagram of a 14V start-stop system as exemplary embodiment for a circuit according to the present invention.

DETAILED DESCRIPTION

In the following, a specific embodiment of the present invention is described in detail with reference to the FIGURE.

FIG. 1 shows a circuit diagram of a 14V start/stop system 2 as exemplary embodiment for a circuit according to the present invention.

14V start-stop system 2 possesses a 12V battery 4 for operating a starter 6 as auxiliary unit to start the internal combustion engine of a vehicle. A battery-management system 8, hereinafter referred to as BMS 8, detects terminal voltage 10 and terminal current 12 of 12V battery 4, and from them, determines a state-of-function value, a state-of-charge value and a state-of-health value over time. The state-of-function value indicates whether 12V battery 4 is capable in general of operating starter 6. The state-of-charge value gives information about the state of charge of 12V battery 4. From the state-of-health value, it may be deduced whether 12V battery 4 is damaged or aged.

In vehicles which possess a 14V start-stop system 2 indicated, BMS 8 is used to avoid the situation that the internal combustion engine can no longer be started owing to a weak 12V battery 4. Thus, if 12V battery 4 is too rundown or for some other reason is not powerful enough, which BMS 8 detects, then the internal combustion engine is no longer switched off. However, if 12V battery 4 has discharged too greatly over too long a time parked or because of too high a demand for no-load current, this mechanism no longer achieves its ends.

In a vehicle in which 14V start-stop system 2 is supplied via a DC/DC converter 14, 12V battery 4 may be recharged via DC/DC converter 14 from a high-voltage battery 16 prior to the start of the internal combustion engine. To that end, weak 12V battery 4 merely has to provide a power for the supply of the high-voltage-battery control units, which, however, is substantially less compared to the power needed to operate starter 6. If 12V battery 4 is recharged in this manner, the internal combustion engine can be started without difficulty.

According to the exemplary embodiments and/or exemplary methods of the present invention, 12V battery 4 is not recharged on the basis of its terminal voltage 10, but rather on the basis of the state-of-charge value, the state-of-health value or the state-of-function value described above. As already mentioned, these values are made available by BMS 8.

A great advantage of the exemplary embodiments and/or exemplary methods of the present invention is now that the values which are used to ascertain the need to recharge are considerably more meaningful with regard to the capability of starting the internal combustion engine than terminal voltage 10 of 12V battery 4. Ideally, the state-of-function value may be used for this purpose. If this criterion negates the startability and the state-of-charge value points to a discharged 12V battery 4, then it may be recharged before a start of the internal combustion engine is carried out. If the state-of-health value points to damage of 12V battery 4, then, on the basis of the state-of-health value, it may be decided whether, in spite of the battery damage, a recharge is worthwhile in order to still start the internal combustion engine, or whether this is not possible, and then no recharging needs to take place, either.

The time delay because of the recharging may be indicated to the driver of the vehicle via a display.

If DC/DC converter 14 possesses sufficient capacity and resistance to short-circuiting, then the internal combustion engine may be started with or without previous recharging of 12V battery 4, using the combined power of DC/DC converter 14 and 12V battery 4. In so doing, attention may be paid to the load dump upon shedding of starter 6, so that the low voltage does not rise too sharply. For example, this occurs in the case of a cold or damaged 12V battery 4, since it then has a high internal resistance. In this case, a sufficiently rapid closed-loop control and/or a precontrol 18, with known engine-power need, may be employed for dealing with the load dump. The decision as to whether DC/DC converter 14 is needed to assist 12V battery 4 may be made as above, on the basis of the state-of-function value, the state-of-charge value and/or the state-of-health value.

According to the exemplary embodiments and/or exemplary methods of the present invention, the state-of-function value, the state-of-charge value and/or the state-of-health value, made available by a BMS 8, is/are drawn upon for assessing the chances of success in starting an internal combustion engine using a starter 6.

In addition to the disclosure above, reference is made here specifically to the disclosure of the FIGURE.

What is claimed is:

1. A circuit for operating an auxiliary unit for starting internal combustion engines via a starter battery, comprising:
    a circuit arrangement, which is a start-stop system having a battery management system, configured to receive a state-of-charge signal and a state-of-function signal and a state-of-health signal from the battery-management system, the respective signals indicating a state of charge of the starter battery, whether the starter battery is capable of operating the auxiliary unit, and whether the starter battery is damaged;
    wherein the circuit arrangement is configured to absorb electrical energy from a high-voltage battery, connected to the circuit arrangement, when the state-of-charge signal indicates that the state of charge of the starter battery is too low to operate the auxiliary unit and when the following is satisfied: (i) the state-of-function signal indicates that operation of the auxiliary unit by the starter battery is not possible, and (ii) the state-of-health signal indicates that the starter battery is damaged, and
    wherein the state of function of the starter battery characterizes whether the starter battery is capable of taking up adequate electrical energy to operate the auxiliary unit.

2. The circuit of claim 1, wherein the circuit is configured to charge the starter battery with the absorbed electrical energy when the state-of-charge signal from the battery-management system indicates the state of charge of the starter battery is too low to operate the auxiliary unit.

3. The circuit of claim 2, further comprising:
    a display for indicating the charging time remaining until the starter battery is charged sufficiently to operate the auxiliary unit.

4. The circuit of claim 1, wherein the circuit arrangement is configured to charge the starter battery with the absorbed electrical energy when the state-of-health signal from the battery-management system indicates a sufficiently intact state of function of the starter battery, in which the starter battery is capable of absorbing adequate electrical energy to operate the auxiliary unit.

5. The circuit of claim 1, wherein the circuit arrangement provides for the direct operation of the auxiliary unit, using the absorbed energy.

6. The circuit of claim 5, further comprising:
    an energy converter for converting the electrical energy, absorbed from the high-voltage battery, into an electrical energy suitable for operating the auxiliary unit.

7. The circuit of claim 6, wherein the energy converter is configured to limit the electrical energy output to the auxiliary unit.

8. The circuit of claim 7, wherein the energy drawn from the high-voltage battery is limited based on the energy output to the auxiliary unit.

9. The circuit of claim 6, further comprising:
    a precontrol unit to adjust the energy supplied to the energy converter based on a predetermined power needed to start the engine.

10. A method for receiving an electrical energy, which is suitable to operate an auxiliary unit for starting internal combustion engines via a starter battery, the method comprising:
    receiving, in a start-stop system having a battery management system, a state-of-charge signal and a state-of-function signal and a state-of-health signal from the battery-management system, the respective signals indicating a state of charge of the starter battery, whether the starter battery is capable of operating the auxiliary unit, and whether the starter battery is damaged; and
    receiving electrical energy from a high-voltage battery when the state-of-charge signal indicates that the state of charge of the starter battery is too low to operate the auxiliary unit and when the following is satisfied: (i) the state-of-function signal indicates that operation of the auxiliary unit by the starter battery is not possible, and (ii) the state-of-health signal indicates that the starter battery is damaged;
    wherein the state of function of the starter battery characterizes whether the starter battery is capable of taking up adequate electrical energy to operate the auxiliary unit.

11. The method of claim 10, wherein the circuit is configured to charge the starter battery with the absorbed electrical energy when the state-of-charge signal from the battery-management system indicates the state of charge of the starter battery is too low to operate the auxiliary unit.

12. The method of claim 11, wherein there is a display for indicating the charging time remaining until the starter battery is charged sufficiently to operate the auxiliary unit.

13. The method of claim 10, wherein the starter battery is charged with the absorbed electrical energy when the state-of-health signal from the battery-management system indicates a sufficiently intact state of function of the starter battery, in which the starter battery is capable of absorbing adequate electrical energy to operate the auxiliary unit.

14. The method of claim 10, wherein there is direct operation of the auxiliary unit using the absorbed energy.

15. The method of claim 14, wherein the electrical energy, absorbed from the high-voltage battery, is converted by an energy converter into an electrical energy suitable for operating the auxiliary unit.

16. The method of claim 15, wherein the electrical energy output to the auxiliary unit is limited by the energy converter.

17. The method of claim 16, wherein the energy drawn from the high-voltage battery is limited based on the energy output to the auxiliary unit.

18. The method of claim 15, wherein the energy supplied to the energy converter based on a predetermined power needed to start the engine is adjusted by a precontrol unit.

* * * * *